United States Patent [19]
Sutra et al.

[11] Patent Number: 5,988,388
[45] Date of Patent: *Nov. 23, 1999

[54] DEVICE AND METHOD FOR THE PROTECTION OF OBJECTS AGAINST IMPACTS OR OTHER MECHANICAL EFFECTS

[75] Inventors: Bernard Sutra, Chatillon; Daniel Josien, Mons en Baroeul, both of France

[73] Assignees: Dassault Electronique, Saint-Cloud, France; Musthane, Lille, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,519

[22] Filed: Nov. 26, 1996

[30] Foreign Application Priority Data

Nov. 27, 1995 [FR] France ................................... 95-14032

[51] Int. Cl.$^6$ ..................................................... B65D 81/02
[52] U.S. Cl. .......................... 206/588; 206/594; 206/592; 267/136
[58] Field of Search ..................................... 248/638, 636, 248/632, 634, 560, 562, 631; 206/444, 542, 523, 521, 522, 588, 594, 592; 267/136

[56] References Cited

U.S. PATENT DOCUMENTS

| | | | |
|---|---|---|---|
| 2,906,525 | 9/1959 | Jarret et al. | 267/2 |
| 4,964,509 | 10/1990 | Insley et al. | 206/204 |
| 5,083,910 | 1/1992 | Abshire et al. | 425/2 |
| 5,330,249 | 7/1994 | Weber et al. | 297/214 |
| 5,564,561 | 10/1996 | Black et al. | 206/219 |
| 5,564,570 | 10/1996 | Jaszai | 206/523 |
| 5,706,969 | 1/1998 | Yamada et al. | 220/422 |

FOREIGN PATENT DOCUMENTS

| | | |
|---|---|---|
| 73 31 639 | 4/1974 | Germany . |
| 76 23 573 | 1/1977 | Germany . |
| WO92/11489 | 7/1992 | WIPO . |

OTHER PUBLICATIONS

Patent Abstracts of Japan, vol. 11, No. 89, Mar. 19, 1987, JP–A–61 243858 (Kiyuubitsuku KK), Oct. 10, 1986.
Patent Abstracts of Japan, vol. 10, No. 171, Jun. 17, 1986, JP–A–61 021436 (kiyuubitsuku Engineering KK), Jan. 30, 1986.
Patent Abstracts of Japan, vol. 10, No. 208, Jul. 22, 1986, JP–A–61 051035 (Kiyuubitsuku KK), Mar. 13, 1986.
Patent Abstracts of JApan, vol. 014, No. 523, Nov. 16, 1990, JP–A–02 219644 (Inaba Rubber KK), Sep. 3, 1990.
Patent Abstracts of Japan, vol. 014, No. 087, Feb. 19, 1990, JP–A–01 299338 (Kiyuubitsuku Eng:KK), Dec. 4, 1989.

*Primary Examiner*—Ramon O. Ramirez
*Assistant Examiner*—Gwendolyn Baxter
*Attorney, Agent, or Firm*—Staas & Halsey

[57] ABSTRACT

A mechanical filter includes a pouch with a double-walled envelope housing a shock-absorbing material in the form of a gel displaceable under pressure. The envelope, of selected geometry, is mainly formed of a thin film of synthetic thermoplastic material, whose physical properties are selected to prevent breakage during displacement of the gel.

9 Claims, 4 Drawing Sheets

DEVICE AND METHOD FOR THE PROTECTION OF OBJECTS AGAINST IMPACTS OR OTHER MECHANICAL EFFECTS

BACKGROUND OF THE INVENTION

The invention relates to the protection of objects against impacts or other mechanical effects.

There is currently a very wide variety of protections of the "mechanical filter" type, among which are "cushion" structures comprising an envelope housing a shock-absorbing material.

Problems arise when the mechanical effect to be combated becomes very large, in terms of energy and/or strength, compared to the mechanical resistance of the object to be protected.

These problems are solvable when enough space is available to house a volume of shock-absorbing material proportional to the mechanical effect to be combated.

On the other hand, very tricky problems are posed when the available space is limited and the mechanical effect is large, as will be seen below. These problems are even more tricky if it is desired that the protective structure be reusable.

SUMMARY OF THE INVENTION

The present invention provides a solution to this problem.

After numerous tests, it was discovered that a "cushion"-type structure has very advantageous properties when in a suitable manner a cooperation is achieved between an envelope formed mainly of a thin film of a material with a high reciprocal value of modulus of elasticity and high elasticity and a shock-absorbing material, whose plastic flow varies with pressure, and preferably decreases with pressure. Although other materials can be considered, a material of the thermoplastic polyurethane type is currently preferred for the envelope, in cooperation with a silicone gel or other similar product having particular characteristics of viscosity, which is in this case called "gel".

Further features and advantages of the invention will appear from a reading of the detailed description below and from the attached drawings.

DETAILED DESCRIPTION OF THE PREFERRED EMBODIMENT

The attached drawings serve not only to assist understanding of the present description, but also contribute to a definition of the invention.

One particular problem posed has been to protect an electronic measuring device, having dimensions of about 200×150×90 mm and a mass of 3 kg, so that it withstands an impact corresponding to an acceleration of 5000 m/s² (500 g) for 3 milliseconds (semi-sinusoidal wave form). The resilient (shock-proof) structure was to take up an extra thickness of about 2 cm to either side of the device.

Tests based in particular on foams, some with "open cells", gas- or water-inflatable envelopes, and mechanical spring-type shock absorbers have not given satisfaction due to insufficient effectiveness and/or excessive bulk. Knowing about the shock-absorbing properties of gels, the Applicants have carried out initial tests with gels in combination with other substances. These tests have proved inadequate due to the effect of bottoming: after the shock-absorbing effect expected, the object to be protected touches the bottom of the support. The insertion of balls, globules or other materials to increase the inertia of the gel has not made it possible to prevent this bottoming.

It was then considered to return to the cushion-type structure, where the gel is enclosed in an envelope. The first tests of this category were carried out with a hollow structure, open on one face, and therefore having walls of an overall thickness of about 20 mm, defined by a polyurethane film 1 mm thick. Bottoming was also observed in this case.

In an unexpected manner, it was observed that by decreasing the thickness of the film, the results are significantly improved. Thus the Applicants arrived at the structure which will now be described.

Figure 1:
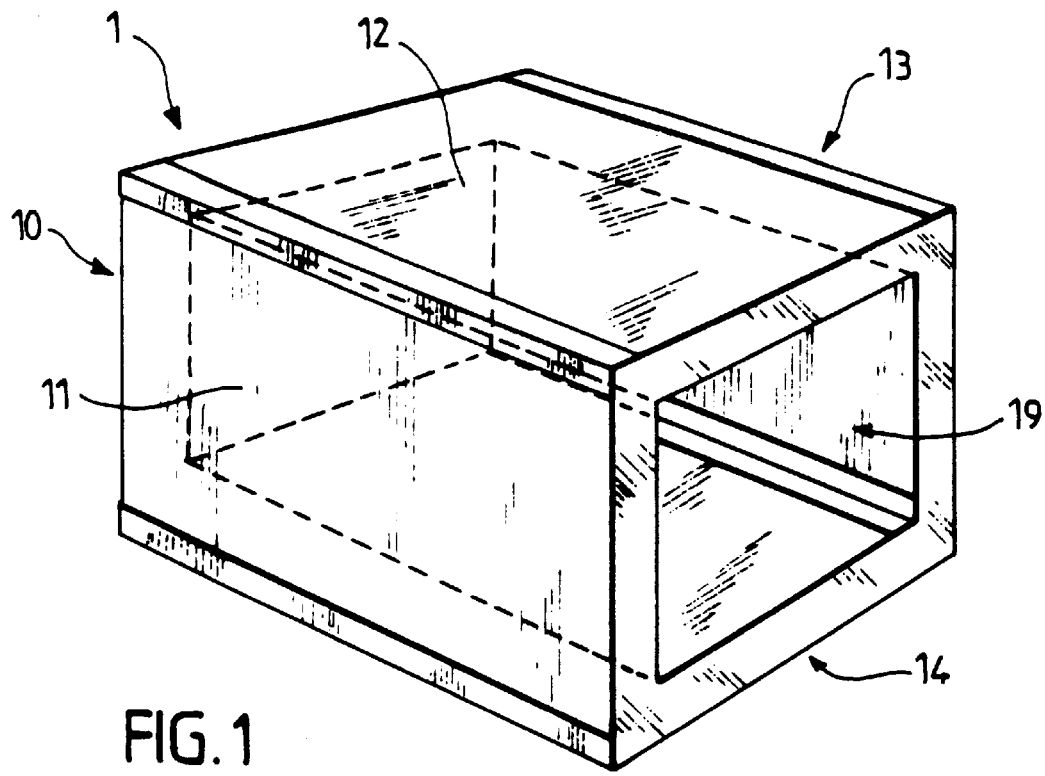
FIG. 1 is a perspective view showing the geometric shape of an embodiment of the structure.

This structure defines a pouch 1 of a general internal and external cuboid shape, with an aperture 19 on one side for the insertion of an object, which is for example as already indicated an electronic measuring device. The geometric shape of the pouch is shown in FIG. 1. This pouch is defined by an external base 10, as well as four external lateral faces 11 and 13 of equal dimensions, and 12 and 14 also of equal dimensions. It is also defined internal base 50, as well as internal faces 51 to 54, corresponding to faces 11 to 14. On the side of the aperture 19, the edges are defined by strips 41 to 44. In the embodiment used, the internal and external faces are formed by a film 400 micrometers thick, for example made of the following thermoplastic polyurethane: UF3 by the firm PLATE BONN GmbH. Properties of this product are given in the following table.

TABLE I

| Physical variable | Unit | Value | Standard |
| --- | --- | --- | --- |
| Melting range | °C | 195–225 | Kofler-Bank |
| Density | Mg/m³ | 1.13 | DIN 53 479 |
| Shore A hardness |  | 86 ± 3 | DIN 53 505 |
| Traction resistance | MPa | 50–65 | DIN 53 455 |
| Elongation at break | % | 500–600 | DIN 53 455 |
| Permanent elongation | % | 80–120 | DIN 53 455 |
| Stress at 100% elongation | MPa | 8 | DIN 53 455 |
| Stress at 300% elongation | MPa | 15 | DIN 53 455 |
| Tear growth resistant (Graves) | kN/m | 55–65 | DIN 53 515 |
| Abrasion loss | mm³ | 20–25 | DIN 53516 |
| Scleroscopic elasticity | % | 33 | DIN 53 512 |
| Permanent deformation under pressure $R_{dv}$ | % |  | DIN 53 517 |
| 70 h at 22° C. |  | 15–25 |  |
| 24 h at 70° C. |  | 50–65 |  |
| Water absorption (24h/H₂O/20° C.) | % | 1.30 | DIN 53 475 |
| Permeability to water vapor (2 mm test tube) | g/m2.d | 4.7 | DIN 53 122 |

This film can be fixed to itself and to other materials by (heat) adhesion and/or welding. It is of food grade, impermeable to water or vapor, and resists well various essences and oils. It has in addition a good temperature resistance, namely from −50° C. to 100° C., or more for a short period. It is also repairable by vulcanisation. Finally, and above all, its capacity for elastic deformation may reach 600%. The Shore hardness does not vary or hardly varies with elastic elongation.

One starts off with two blanks before folding, one corresponding to the external base 10 and to the four external faces 11 to 14, and the other to the internal base 50 and to the four internal faces 51 to 54. After folding, the shaped assembly is formed by means of strips (21 to 24 on the outside, 31 to 34 on the inside) of the same material as previously, but of a greater thickness, for example 1 mm. The whole is then mounted on a, preferably two, masters or molds (internal and external), which hold its shape. The thickness of the wall of the pouch, between two films, is typically in this case slightly less than 23 mm. Then the gap between the external and internal walls of the pouch is filled with a silicone gel 9, which is for example Rhodorsil RTV 08-B or RTV 1508-A/B sold by RHONE POULENC, to form an envelope. Properties of the gel are given in the table below:

TABLE II

| Physical variable | Unit | Value | Standard |
|---|---|---|---|
| Density at 25° | | 0.97 | |
| Viscosity | mPa · s | 650 | |
| Consistency at penetrometer | | 240 | ASTMD 217 |
| Thermal behavior | ° C | −50 to +200 | |
| Dielectric strength | kV/mm | 18 | AFMOR C28225 and CEI243 |

This is a product with two components, one of which is a reticulation accelerator. They are mixed just before filling. After degassing of the liquid mixture, filling in the manner of a spring from the bottom of the envelope is carried out progressively. Reticulation then takes place, preferably with slight heating. One or more heat cycles under vacuum up to for example 80° C. are advantageously carried out to improve the performance of the compound which the polyurethane gel forms. The strips 41 to 44 are then placed over the free edges of the pouch aperture in order to ensure complete tightness.

Figure 2:
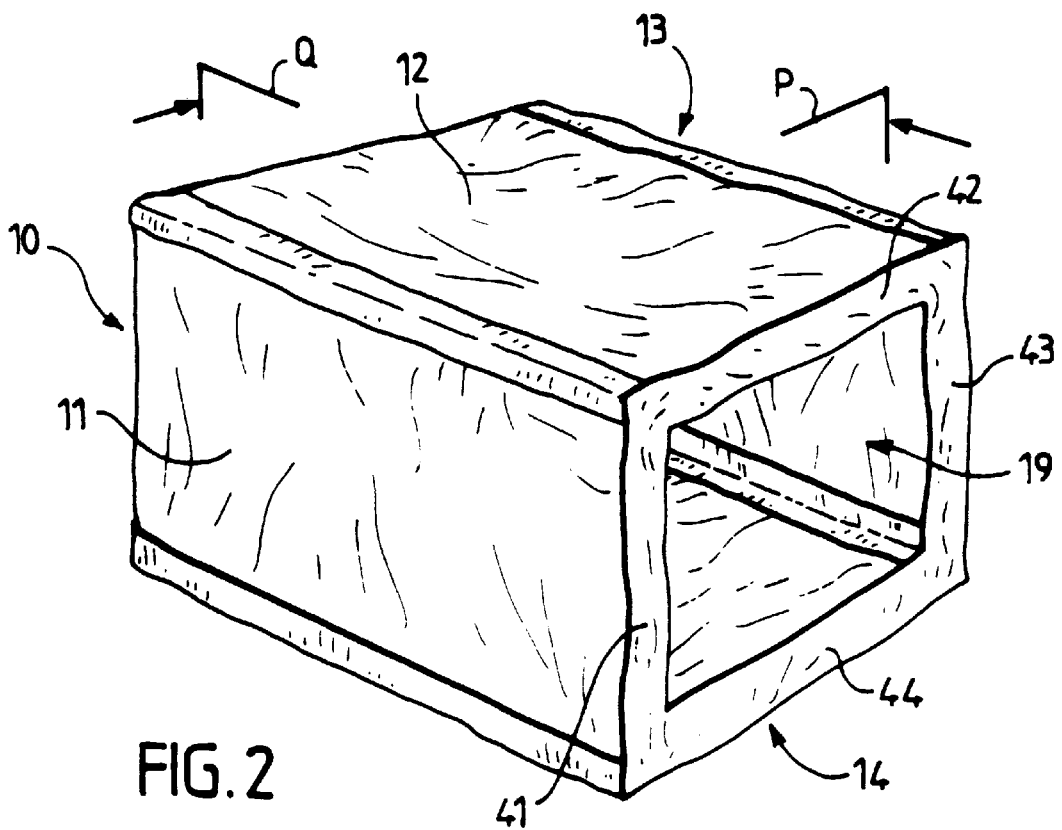
FIG. 2 is a similar view to FIG. 1, but seeking to reflect its actual shape.
Figure 3:
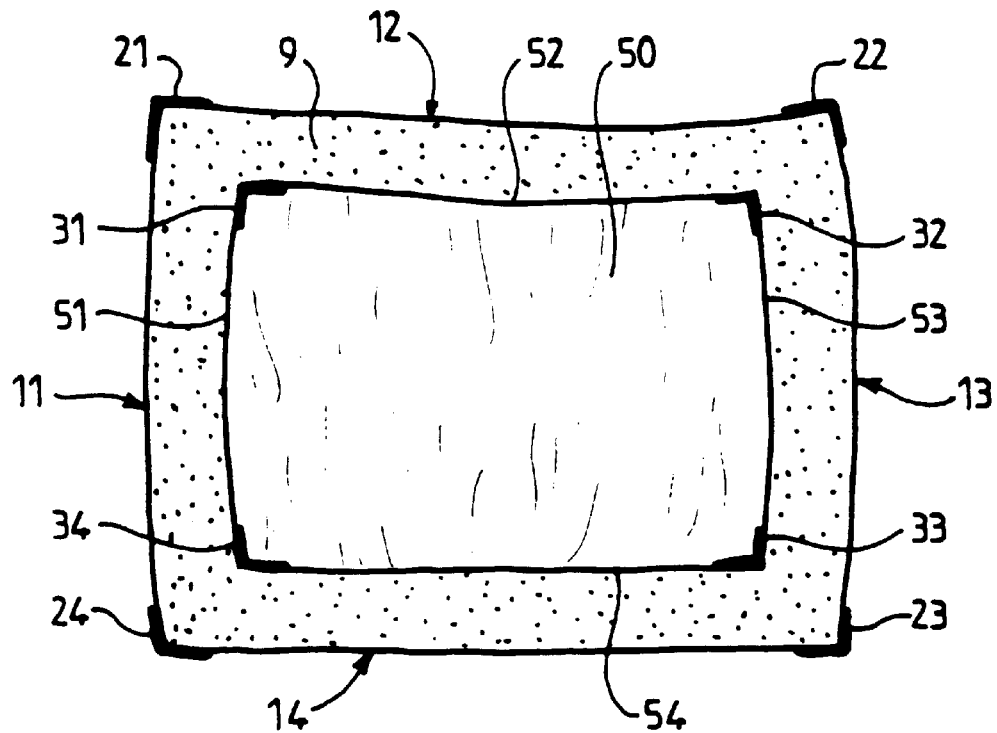
FIG. 3 is a view in transverse section along the plane P of FIG. 2, towards the rear.
Figure 4:
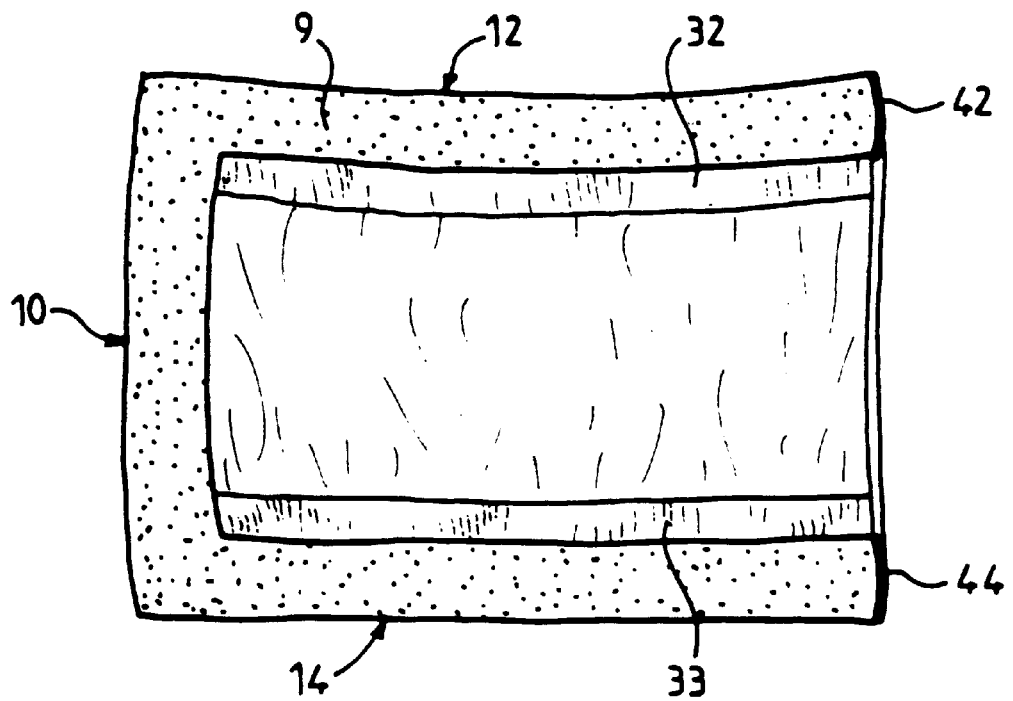
FIG. 4 is a view in longitudinal section along the plane Q of FIG. 2, to the right.

The filling is carried out carefully, preferably under slight pressure, so as to allow as little air as possible between the two walls of the pouch. The structure therefore has both a defined geometry due to folding and the construction of the envelope, and a suppleness which makes it somewhat "irregular", as can be seen in FIG. 2.

In general, the fixing of the superimposed film (thickness 1 mm) over the base film of 400 micrometers is effected by heat welding or adhesion.

Reinforcements can also be provided in the folded parts of the film in the form of strips 400 micrometers thick for example, fixed as above. The same can be done for the large faces in the vicinity of the free edges of the pouch.

Figure 5:
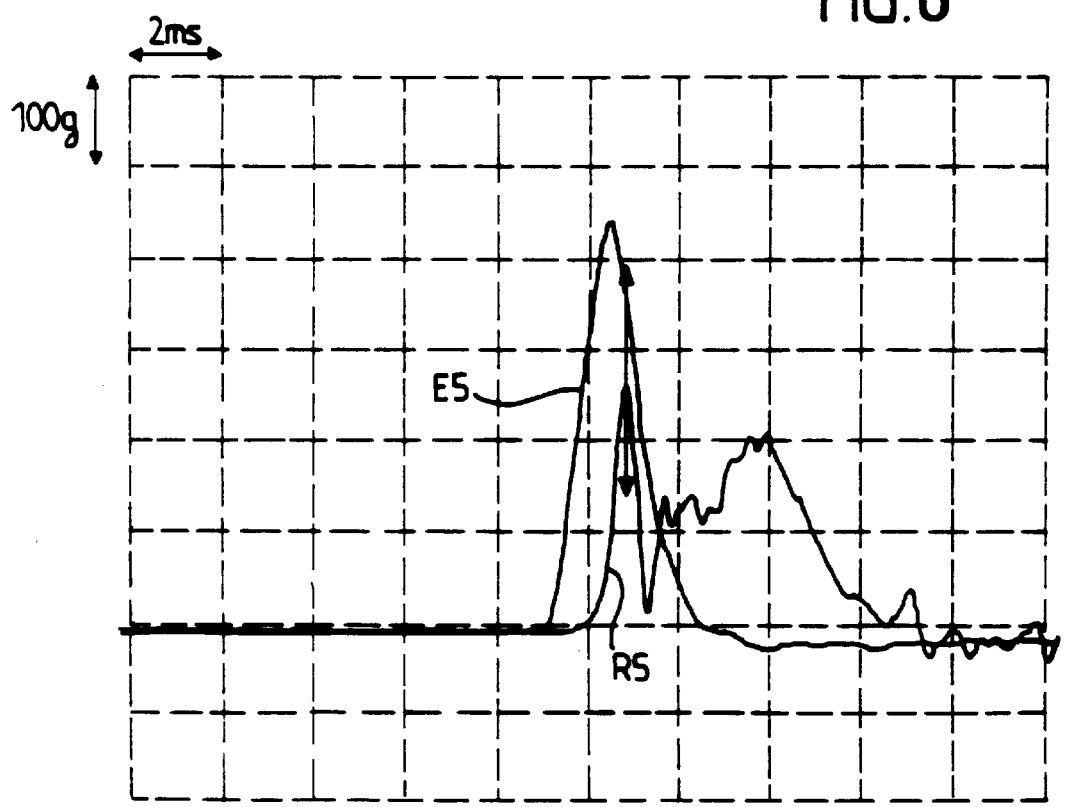
FIG. 5 is a time graph showing the acceleration applied and the acceleration felt by a sensor.

Tests were carried out in particular with a "shock machine" capable of working along all axes. The device placed in the pouch is capable of carrying out a measurement of the acceleration imparted. The acceleration applied E5 was in the form of a semi-sinusoidal wave of 3 ms duration, with a ridge value of about 500 g; the device inserted into the pouch underwent (curve R5) a brief, delayed peak of acceleration of 240 g, followed by a response staggered in time, as is shown in FIG. 5. No damage of the internal device placed in the pouch was observed. Oblique or transverse accelerations were also withstood without damage.

It was therefore proved that this structure was satisfactory, whereas all preceding tests proved fruitless. The physical phenomena implied have not yet been fully understood. It is currently considered that the good functioning derives principally from an optimization of the elastic deformability properties and of the modulus of elasticity at elongation, without break, of the envelope, relative to the "demand for deformation" of the gel, when the gel reacts to the attacking mechanical effect whose consequences are hoped to be avoided.

The most spectacular feature of the proposed structure is its absence of bottoming, a component of the problem posed which has been particularly difficult to overcome.

It is also thought that the compressibility of the silicone gel has a certain importance. The same applies to the mechanical adhesions of the gel to the polyurethane skin.

It seems preferable today that the pouch should match quite closely, preferably with a very slight stress, the shape of the object to be protected. However, this does not mean that one cannot dispense with such a measure, for example if the attacking mechanical effect to be combated is other than a very strong acceleration or a very strong impact.

Furthermore, a certain "memory effect" was observed, i.e. the structure, which deforms when it is alone at rest is capable of rapidly regaining its reference shape as soon as the device or a master of the same shape is inserted. On the other hand, the structure does not seem to suffer substantially from repeated impacts.

The tests carried out with larger structures have shown that in order to retain the same mechanical properties, there was a need not to make the film thicker but to provide a greater thickness of gel between the two walls of the film.

In general, it seems that the gel has a shock-absorbing or filtering role in the manner of a capacitance, to use an electrical analogy. In order that the severity of the impact is well absorbed, it seems desirable that the film is not too rigid (thick films had not been satisfactory). In the electrical analogy, this corresponds to a limited inductive effect. Still using the same analogy, "resistance" is defined by the friction of the gel with itself and with the film.

The structure seems to react in two stages:
a first phase, of the "inductive" type, where it comes close to being the perfect spring; and
a second phase, of the "capacitive" type, where it comes close to being the perfect shock-absorber.

In particular, no perceptible ringing was observed.

In other words, examination of the behavior of this structure with respect to impacts suggests that it operates very close to critical shock-absorbing in response to the semi-sinusoidal acceleration impulse of 500 g for 3 milliseconds.

In a more mechanical approach, one will also take into account the combination of the displacement which the gel undergoes under the effect of the impact, and of the high elastic deformation resulting in the film without tearing, both locally by virtue of the gel/film friction coefficient and/or the gel/film adhesion, and to a certain extent globally by the effect of confined volume (geometry of the structure).

These parameters are naturally difficult to quantify currently, even for the single impact at 500 g/3 ms mentioned above. The person skilled in the art will however be able to adjust the compressibility and/or viscosity properties of the gel at the same time as those of elastic elongation of the film (coefficient and modulus) as a function of the geometry of the pouch (more generally of the structure) to arrive at comparable results.

Similar structures can be tested for other types of excitation forms corresponding to attacking mechanical effects, and which were impossible to avoid until now with a low thickness.

"Mechanical effects" are understood to mean here impacts and/or accelerations, but also more generally vibrations, mechanical and/or acoustic, or others, capable of generating mechanical effects.

Figure 6:
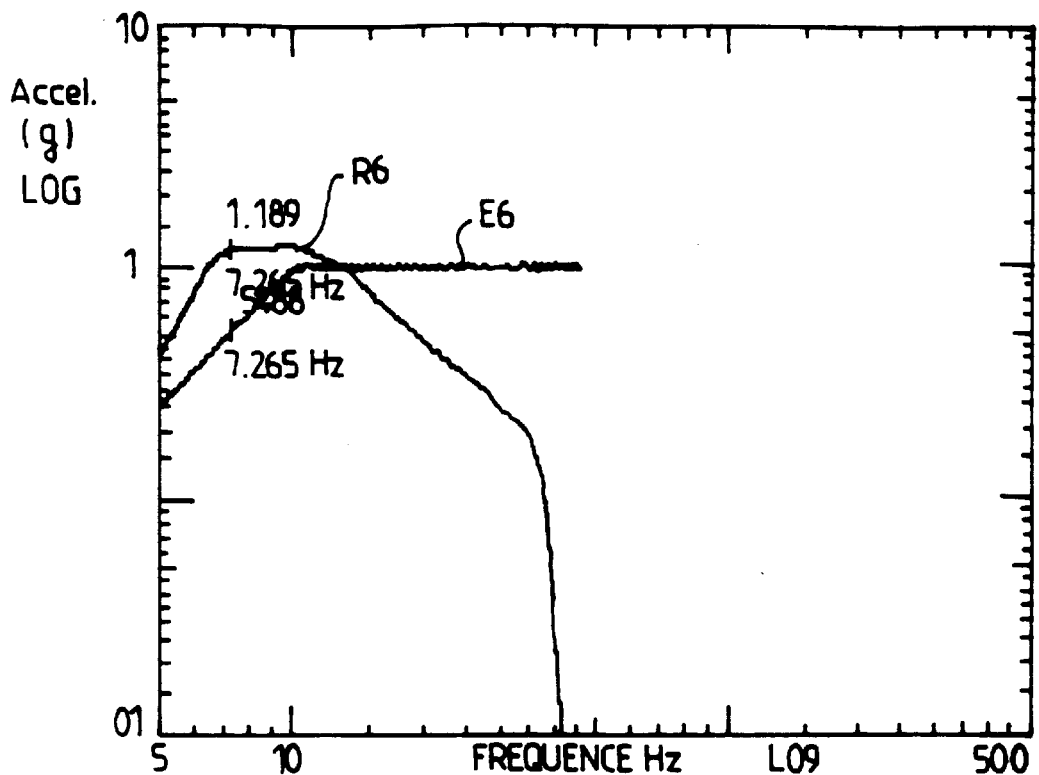
FIG. 6 is a frequency graph showing the excitation applied and the excitation felt by a sensor, both on a logarithmic scale.

FIG. 6 shows the frequency response of the device. The excitation E6 was of 1 g from 10 Hz to 500 Hz. From 5 to 10 Hz, it was limited by a maximum excursion of 5 mm. The tests in all axes have shown a very low coefficient of overvoltage (Q<2). In the drawing, the resonance frequency is about 7.25 Hz, for an acceleration of 1.189 g, under excitation of 0.5488 g. The cut-off frequency at −3 dB is about 30 Hz. The speed of the response R6 of FIG. 6 therefore also suggests good behavior of the device in vibratory mode.

Figure 7:
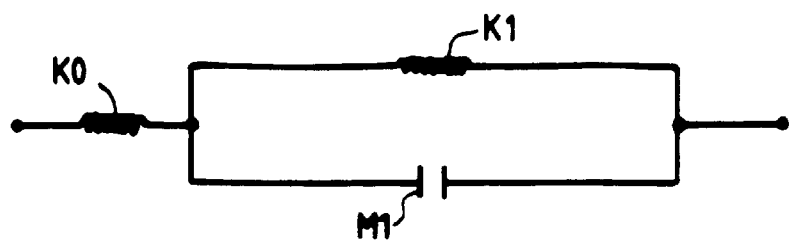
FIGS. 7 and 8 are equivalent electrical circuit diagrams.
Figure 8:
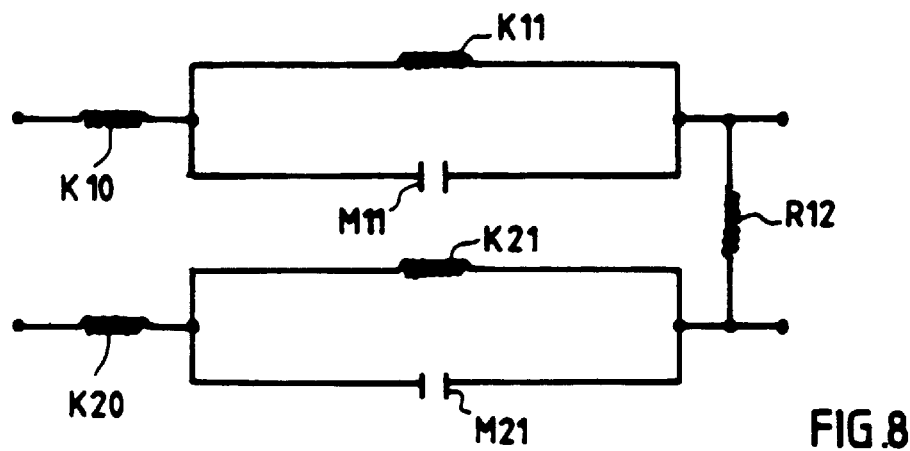

Complementary studies were undertaken in order to define better the operation of the proposed device. These use rheology, described in particular in the work "Des Materiaux" by J M DORLOT, J P BAILON, J MASOUNAVE, Editions de l'école polytechnique de Montreal. The chapter "Viscoelasticity" (page 171) describes the viscous behavior as assimilable by an electrical assembly of the type shown in FIG. 7, where K1 and K0 are inductances, whereas M1 is a capacitance. FIG. 8 therefore shows the device according to the invention, with K11, K10 and M11 for the gel, K21, K20 and M21 for the envelope, and the resistance R12 for the gel/envelope interaction.

Figure 9:
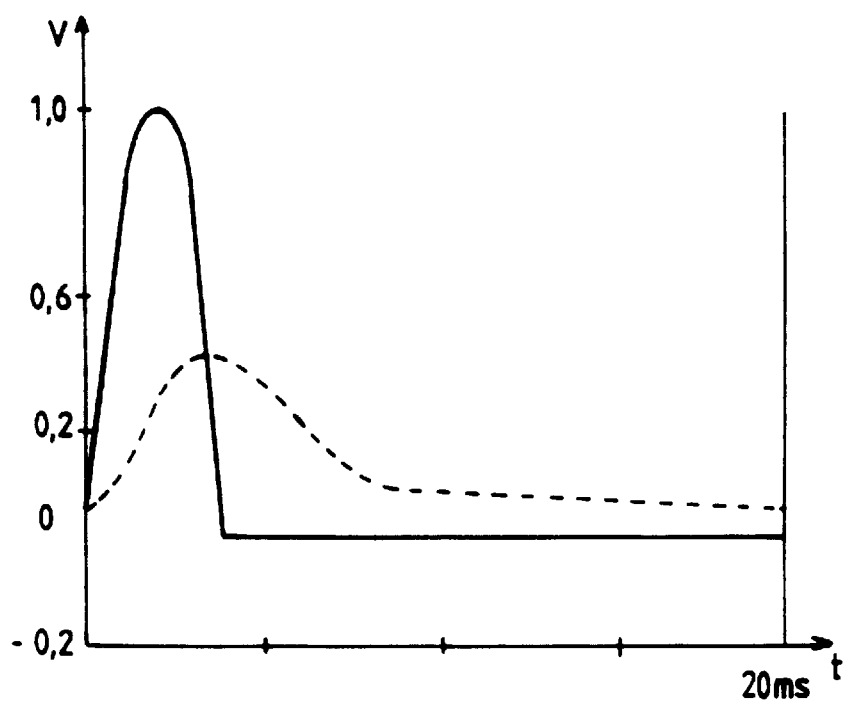
FIG. 9 is a voltage/time graph corresponding to these equivalent circuit diagrams.

Based on the actual measurements given in FIG. 6, it is possible to parameter the operation equations with an electrical model presumed to be equivalent to the structure described. By applying to this electric model a theoretical semi-sinusoidal excitation (FIG. 9, solid line, which does not correspond exactly to the rising/falling of a piston in mechanics), a "critical" voltage/time response (dotted outline) can be obtained which corresponds quite well to FIG. 6. This critical response is an optimum net from:

responses which are too reactive (capacitive or inductive), and responses which are too little reactive, in which the resistance is dominating; this induces a low efficiency of operation, where a minimum volume is sought.

These imbalances result in an unadapted distribution of energy during the shock absorption process.

These experiments, which confirm the analysis made above, may be used for the adaptation of all modifications of the structure described.

We claim:

1. A mechanical filter for receiving an object and protecting the object from a shock, comprising: a continuous envelope housing a self-contained shock-absorbing material between a first internal wall intended to receive the object, and a second external opposing wall which receives the shock, wherein the shock-absorbing material is a gel which is continuous in the envelope and which displaces within the continuous envelope from a first area under pressure from the shock, which first area would be supporting the object, to a second area, the envelope including a thin film forming said first and second walls, having a high elastic lengthening property to prevent breakage when the gel displaces, and defining, in cooperation with a viscosity of the gel, a geometrical structure wherein the object should be received in the first area and, wherein, once the shock is received, the film and gel provide a spring effect, followed by a shock absorber effect.

2. The filter according to claim 1, wherein the thin film is made of a synthetic thermoplastic material.

3. The filter according to claim 1, wherein the geometrical structure is rectangular.

4. The filter according to claim 1, wherein the geometrical structure defines a pouch capable of housing the object therein.

5. The filter according to claim 4, wherein the pouch comprises a recess substantially similar in shape to the object to be protected.

6. The filter according to claim 4, further comprising a space between the first and second opposing walls, which space increases in proportion to an increase in surface area of the first and second walls.

7. The filter according to claim 4, wherein the pouch includes at least two envelope portions, a first of which connects to a second at a junction, and the first extending from the second at an angle, and wherein the film is thicker at the junction than in a remainder of the at least two envelope portions.

8. The filter according to claim 1, wherein the gel substantially completely fills the envelope.

9. A method for mechanically protecting an object from shock, comprising the steps of:

forming a mechanical filter including a continuous envelope housing a self-contained shock-absorbing material which is a gel that displaces within the continuous envelope from a first area under pressure to a second area, the envelope including a thin film having a high elastic lengthening property;

selecting the thin film to withstand breakage when the gel displaces; and assembling the thin film, in cooperation with a viscosity of the gel, to define a geometrical structure wherein said object should be received in the first area.

\* \* \* \* \*